(12) United States Patent
Jiang et al.

(10) Patent No.: US 11,366,497 B2
(45) Date of Patent: Jun. 21, 2022

(54) MULTI-MACHINE-BODY DEVICE

(71) Applicant: PEGATRON CORPORATION, Taipei (TW)

(72) Inventors: Cheng-Shi Jiang, Taipei (TW);
Hung-Chung Ku, Taipei (TW);
Yen-Chih Kuo, Taipei (TW);
Chih-Ming Chen, Taipei (TW);
Chih-Liang Chiang, Taipei (TW);
Jeng-Hong Chiu, Taipei (TW);
Cheng-Yu Ko, Taipei (TW);
Zhang-Zheng Lin, Taipei (TW);
Wen-Hong Lu, Taipei (TW); Jie-Wen Yang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 62 days.

(21) Appl. No.: 16/953,159

(22) Filed: Nov. 19, 2020

(65) Prior Publication Data
US 2021/0165464 A1   Jun. 3, 2021

(30) Foreign Application Priority Data

Dec. 3, 2019 (TW) .................................. 108144132

(51) Int. Cl.
| | | |
|---|---|---|
| *E05D 11/10* | (2006.01) | |
| *G06F 1/16* | (2006.01) | |
| *E05D 3/02* | (2006.01) | |

(52) U.S. Cl.
CPC .............. *G06F 1/1681* (2013.01); *E05D 3/02* (2013.01); *E05D 11/1028* (2013.01);
(Continued)

(58) Field of Classification Search
CPC ............. Y10T 16/5387; Y10T 16/5388; Y10T 16/53888; Y10T 16/5389; Y10T 16/5401;
(Continued)

(56) References Cited

U.S. PATENT DOCUMENTS

| | | | | |
|---|---|---|---|---|
| 8,405,978 B2 * | 3/2013 | Okutsu | ..................... | H05K 7/16 |
| | | | | 361/679.55 |
| 8,646,152 B2 * | 2/2014 | Lin | ........................... | E05D 3/04 |
| | | | | 16/330 |

(Continued)

FOREIGN PATENT DOCUMENTS

| | | |
|---|---|---|
| TW | M488837 | 10/2014 |
| TW | M572622 | 1/2019 |

OTHER PUBLICATIONS

"Search Report of Europe Counterpart Application", dated May 6, 2021, p. 1-p. 11.

*Primary Examiner* — Chuck Y Mah
(74) *Attorney, Agent, or Firm* — J.C. Patents

(57) ABSTRACT

A multi-body device includes a first machine body, a second machine body, a rotating member, a first magnetic member, a second magnetic member, and a stopper. The second machine body is pivoted to a pivot side of the first machine body. The rotating member is pivoted to the pivot side of the first machine body and located beside the second machine body. The first magnetic member is disposed at the second machine body. The second magnetic member is disposed at a portion of the rotating member corresponding to the first magnetic member. Two corresponding ends of the first magnetic member and the second magnetic member are magnetically repulsive to each other. The stopper is driven (Continued)

by the second machine body and disposed at the pivot side of the first machine body, so as to stretch into or retreat from a rotation path of the rotating member.

10 Claims, 10 Drawing Sheets

(52) U.S. Cl.
CPC ..... *E05Y 2201/224* (2013.01); *E05Y 2201/46* (2013.01); *E05Y 2201/484* (2013.01); *E05Y 2900/606* (2013.01)

(58) Field of Classification Search
CPC ......... Y10T 16/5518; Y10T 16/540255; Y10T 16/5398; E05Y 2900/606; E05Y 2201/224; E05Y 2201/46; E05Y 2201/484; F16M 11/38; E06F 1/1626; E06F 1/1681; H05K 5/0226; H04M 1/0216; G06F 1/1681; G06F 1/1616; G06F 1/1618; G06F 1/1679; E05D 3/02; E05D 3/022; E05D 11/1028; E05D 11/08; E05D 11/081; E05D 11/082; E05D 11/084; E05D 11/085
See application file for complete search history.

(56) References Cited

U.S. PATENT DOCUMENTS

| | | | | |
|---|---|---|---|---|
| 9,223,347 | B2* | 12/2015 | Hsu | G06F 1/1656 |
| 10,061,396 | B1* | 8/2018 | Shibayama | G06F 1/1681 |
| 10,203,729 | B1 | 2/2019 | Chen et al. | |
| 10,208,842 | B2* | 2/2019 | Chen | F16H 25/18 |
| 10,606,311 | B2* | 3/2020 | Shindo | G06F 1/1628 |
| 10,655,373 | B2* | 5/2020 | Cheng | E05D 3/02 |
| 10,678,312 | B2* | 6/2020 | Hsu | G06F 1/1616 |
| 10,876,337 | B2* | 12/2020 | Lin | E05D 15/06 |
| 2010/0269298 | A1 | 10/2010 | Chiang | |
| 2012/0212924 | A1* | 8/2012 | Nakajima | G06F 1/1681 361/807 |
| 2014/0262876 | A1 | 9/2014 | Bates et al. | |
| 2015/0120980 | A1* | 4/2015 | Kim | G06F 1/1681 710/303 |
| 2016/0062413 | A1* | 3/2016 | Sano | G06F 1/1632 16/231 |
| 2016/0201367 | A1* | 7/2016 | Kato | E05D 3/122 361/679.09 |
| 2017/0315593 | A1* | 11/2017 | Liang | G06F 1/1626 |
| 2020/0183463 | A1* | 6/2020 | Chen | E05D 11/081 |

* cited by examiner

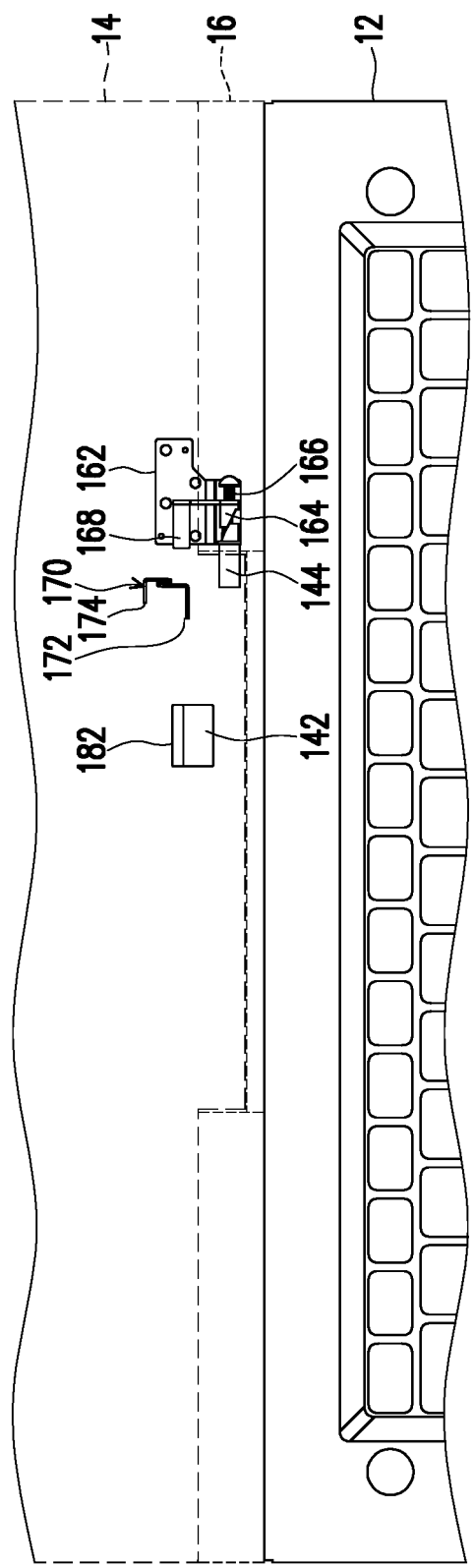

MULTI-MACHINE-BODY DEVICE

CROSS-REFERENCE TO RELATED APPLICATION

This application claims the priority benefit of Taiwan application no. 108144132, filed on Dec. 3, 2019. The entirety of the above-mentioned patent application is hereby incorporated by reference and made a part of this specification.

BACKGROUND

Technical Field

The disclosure relates to a multi-body device, and in particular, to a rotatable multi-body device.

Description of Related Art

Nowadays, regarding a rotatable multi-body device, e.g., a laptop, in order to smoothly rotate between a second machine body and a first machine body, space is reserved at the rear side (a rotation path) of the second machine body of the laptop for flipping over the second machine body, so as to prevent possible abrasions from interference with other structures. A common practice is to provide a gap at a pivot side of the first machine body to make room for the second machine body to flip over; however, the appearance of the laptop cannot remain intact when the second machine body and the first machine body are folded shut, thus reducing appearance integrity.

SUMMARY

The disclosure provides a multi-body device with an intact appearance, and space may be reserved at a rear side of a second machine body for flipping over the second machine body without raising an issue of interference.

According to an embodiment of the disclosure, a multi-body device includes a first machine body, a second machine body, a rotating member, a first magnetic member, a second magnetic member, and a stopper. The second machine body is pivoted to a pivot side of the first machine body. The rotating member is pivoted to the pivot side of the first machine body and located beside the second machine body. The first magnetic member is disposed at the second machine body. The second magnetic member is disposed at a portion of the rotating member corresponding to the first magnetic member. Two corresponding ends of the first magnetic member and the second magnetic member are magnetically repulsive to each other. The stopper is driven by the second machine body and disposed at the pivot side of the first machine body, so as to stretch into or retreat from a rotation path of the rotating member. When the second machine body and the first machine body are folded shut, the second machine body drives the stopper to stretch into the rotation path of the rotating member to prevent the rotating member from rotating. When the second machine body is opened up relative to the first machine body, the second machine body drives the stopper to retreat from the rotation path of the rotating member, and drives the first magnetic member to approach the second magnetic member, so the second magnetic member moves away from the first magnetic member due to a magnetic repulsive force and drives the rotating member to rotate to prevent the rotating member from interfering, during rotation of the second machine body, with the second machine body.

In an embodiment of the disclosure, the multi-body device further includes a torsion spring. One end of the torsion spring is fixed to the first machine body, and the other end of the torsion spring is fixed to the rotating member. When the second machine body approaches the first machine body, the torsion spring drives the rotating member to return, and the stopper stretches into the rotation path of the rotating member.

In an embodiment of the disclosure, the multi-body device further includes a rotating shaft. The rotating shaft is disposed at the second machine body and pivoted to the first machine body, and the rotating shaft includes a first inclined surface.

In an embodiment of the disclosure, the multi-body device further includes a shaft and a moving member. The shaft is disposed at the first machine body, and the rotating shaft is sleeved on the shaft. The moving member is movably disposed at the first machine body and includes a second inclined surface abutting the first inclined surface. The stopper is driven by the moving member. While the second machine body is opened up, the rotating shaft rotates, and the first inclined surface drives the second inclined surface to move the moving member, and thereby the stopper retreats from the rotation path of the rotating member.

In an embodiment of the disclosure, the multi-body device further includes an elastic member sleeved on the shaft and abutting the moving member or the stopper, so that the moving member returns while the second machine body is approaching the first machine body.

In an embodiment of the disclosure, the multi-body device further includes a fixing member. The fixing member is fixed to the first machine body and includes a pivot hole and a groove. The rotating shaft passes through the pivot hole. The shaft is fixed to a fixing member. The stopper is sleeved on the shaft and includes a protrusion stretching into the groove.

In an embodiment of the disclosure, the stopper includes a first segment and a second segment connected in a bending manner. The first segment is sleeved on the shaft, and the second segment is adapted for stretching into the rotation path of the rotating element or retracting into the first machine body to leave the rotation path of the rotating member.

In an embodiment of the disclosure, the pivot side of the first machine body includes a gap. When the second machine body and the first machine body are folded shut, the gap is filled with the rotating member and a part of the second machine body.

In an embodiment of the disclosure, the pivot side of the first machine body includes an air outlet. When the second machine body and the first machine body are folded shut, the rotating member covers the air outlet, and when the second machine body is opened up relative to the first machine body, the rotating member is lifted to expose the air outlet.

In an embodiment of the disclosure, a rotation direction of the second machine body is opposite to a rotation direction of the rotating member.

In view of the above, the rotating member of the multi-body device provided in one or more embodiment of the disclosure is disposed on the pivot side of the first machine body and is located beside the second machine body, so that the appearance of the multi-body device remains intact when the second machine body and the first machine body are folded shut. In addition, the first magnetic member is disposed at the second machine body. The second magnetic member is disposed at the rotating member, and the first magnetic member and the second magnetic member are mutually repulsive to each other. While the second machine body is opened up relative to the first machine body, the first magnetic member approaches the second magnetic member, so the second magnetic member moves away from the first magnetic member due to the magnetic repulsion force and drives the rotating member to rotate, thus making room for preventing interference with the second machine body. Moreover, the stopper is driven by the second machine body and is retractably disposed at the pivot side of the first machine body, so as to be adapted to stretch into or retreat from the rotation path of the rotating member. When the second machine body and the first machine body are folded shut, the stopper stretches into the rotation path of the rotating member to prevent the rotating member from rotating, thus effectively preventing the rotating member from being accidentally touched and rotated.

Several exemplary embodiments accompanied with figures are described in detail below to further describe the disclosure in details.

BRIEF DESCRIPTION OF THE DRAWINGS

Reference will now be made in detail to the embodiments of the disclosure, examples of which are illustrated in the accompanying drawings. Wherever possible, the same reference numbers are used in the drawings and the description to refer to the same or like parts.

FIG. 3B is a schematic partial top view of FIG. 2B.

DESCRIPTION OF THE EMBODIMENTS

Figure 1A:
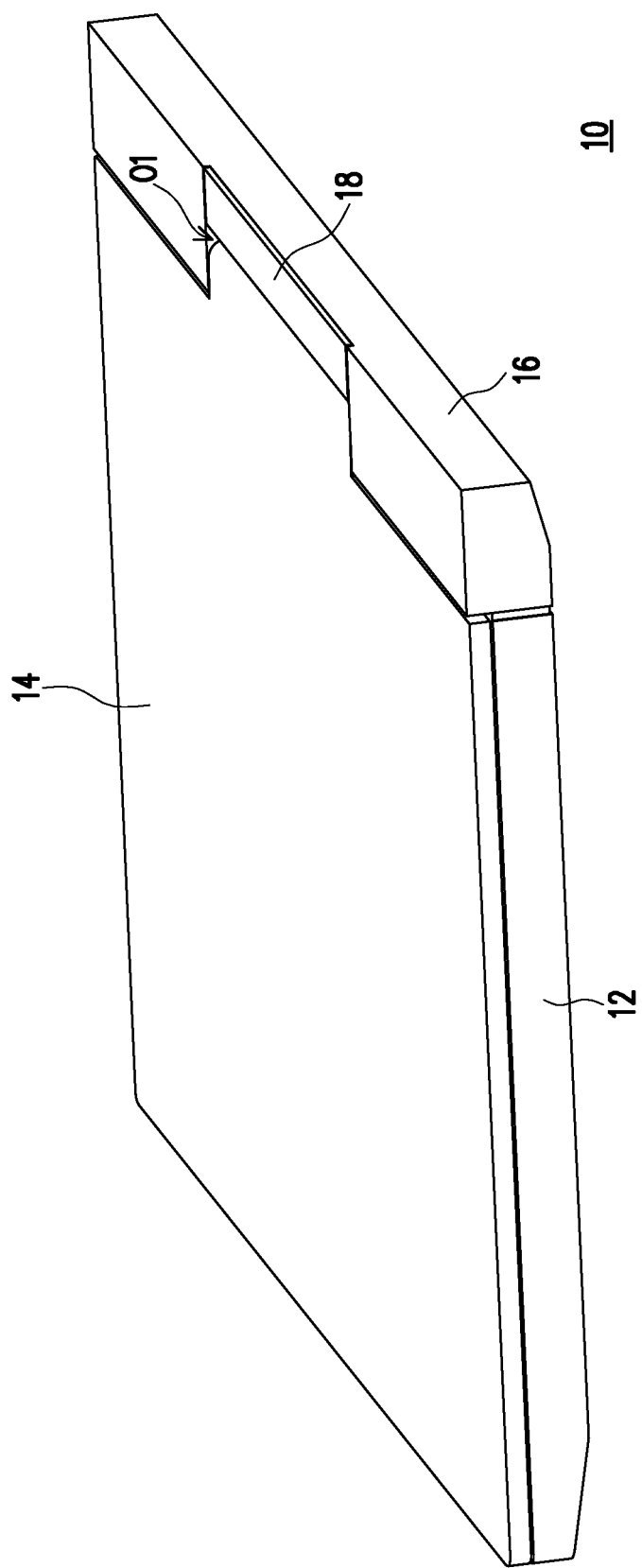
FIG. 1A is a schematic diagram of an appearance of a multi-body device when a second machine body of the multi-body device is folded shut on a first machine body according to an embodiment of the disclosure.
Figure 1B:
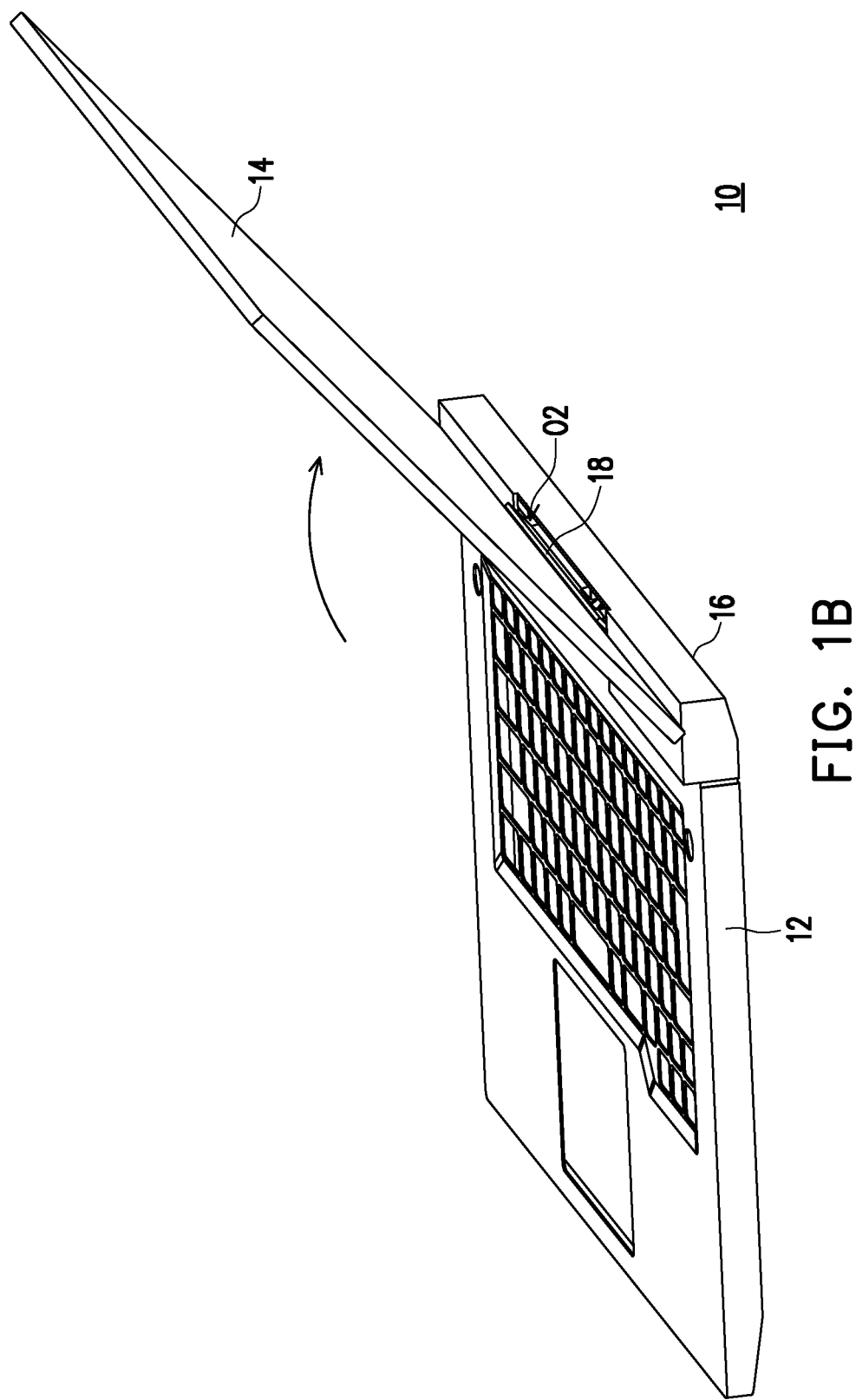
FIG. 1B is a schematic diagram of an appearance of the multi-body device when the second machine body of the multi-body device in FIG. 1A is opened up relative to the first machine body.

FIG. 1A is a schematic diagram of an appearance of a multi-body device when a second machine body of the multi-body device and a first machine body are folded shut according to an embodiment of the disclosure. FIG. 1B is a schematic diagram of an appearance of the multi-body device when the second machine body of the multi-body device in FIG. 1A is opened up relative to the first machine body. Referring to FIG. 1A and FIG. 1B, a multi-body device 10 of the present embodiment is, for example, a laptop, but the type of the multi-body device 10 is not limited thereto. The multi-body device 10 includes a first machine body 12, a second machine body 14, and a rotating member 18. The first machine body 12 is, for example, a computer assembly of a laptop, and the second machine body 14 is, for example, a monitor of the laptop.

A pivot side 16 of the first machine body 12 has a gap O1, and the second machine body 14 is pivoted to the pivot side 16 of the first machine body 12. The rotating member 18 is pivoted to the pivot side 16 of the first machine body 12 and is located beside the second machine body 14. As can be seen from FIG. 1A, when the second machine body 14 and the first machine body 12 are folded shut, the gap O1 is filled with the rotating member 18 and a part of the second machine body 14. In other words, an outer contour of a pivot area of the second machine body 14 and an outer contour of the rotating member 18 conform to a contour of the gap O1. Therefore, an appearance of the multi-body device 10 may remain intact.

In addition, as shown in FIG. 1B, the pivot side 16 of the first machine body 12 has an air outlet O2. When the second machine body 14 is folded shut on the first machine body 12 (FIG. 1A), the rotating member 18 covers the air outlet O2 to prevent dust or dirt from entering the pivot side 16 of the first machine body 12 through the air outlet O2.

When the second machine body 14 is opened up relative to the first machine body 12, the rotating member 18 may rotate correspondingly to make room for the second machine body 14 to flip over without interfering with the second machine body 14. In other words, the multi-body device 10 of the present embodiment may provide a non-interfered rotation path for the second machine body 14, so that the second machine body 14 is smoothly flipped over without any abrasion. In addition, the rotating member 18 is lifted to expose the air outlet O2, thereby improving heat dissipation. A detailed structure is described below.

Figure 2A:
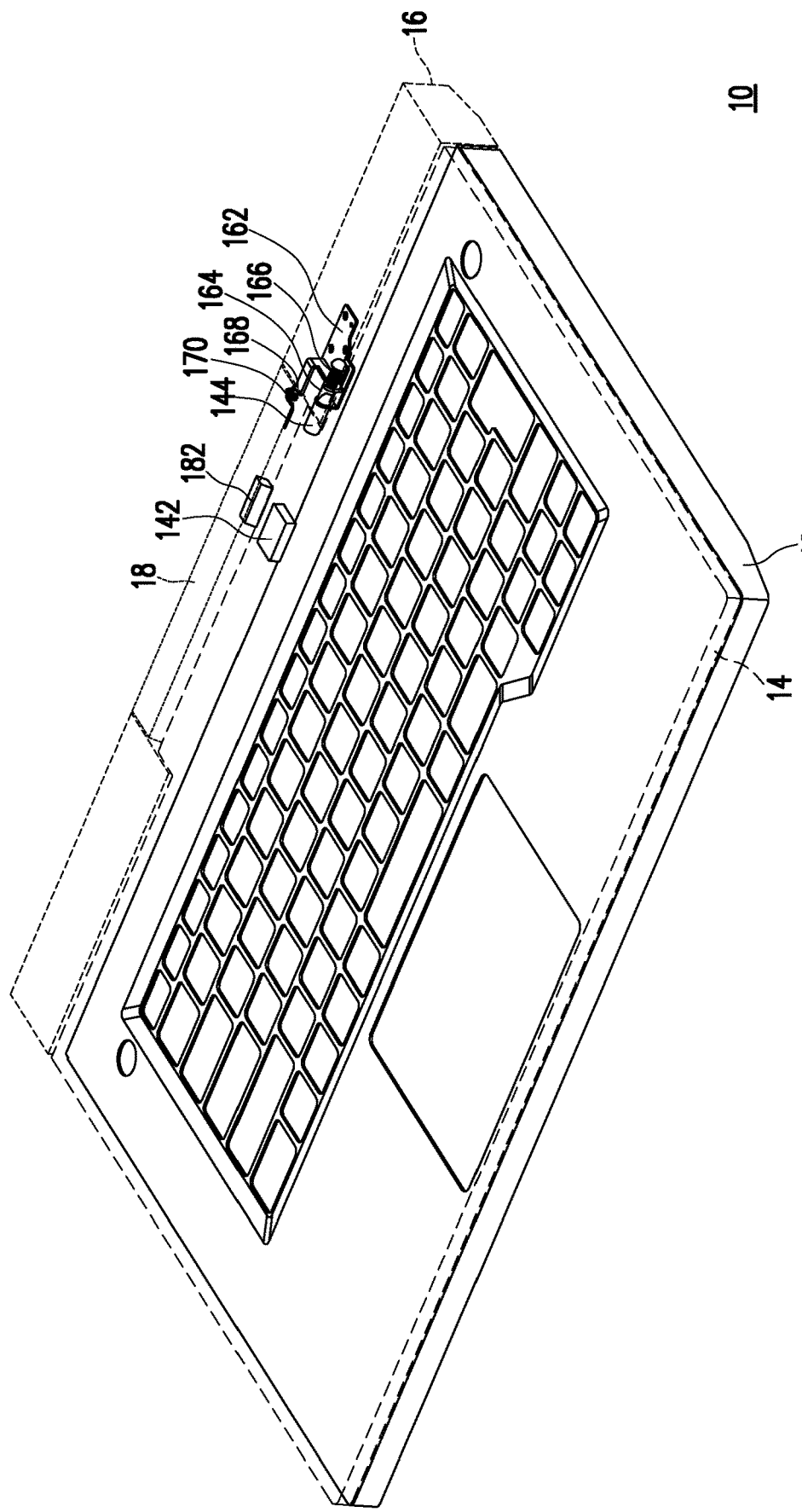
FIG. 2A is a schematic perspective diagram of the second machine body, the rotating member, and the pivot side in FIG. 1A.
Figure 2B:
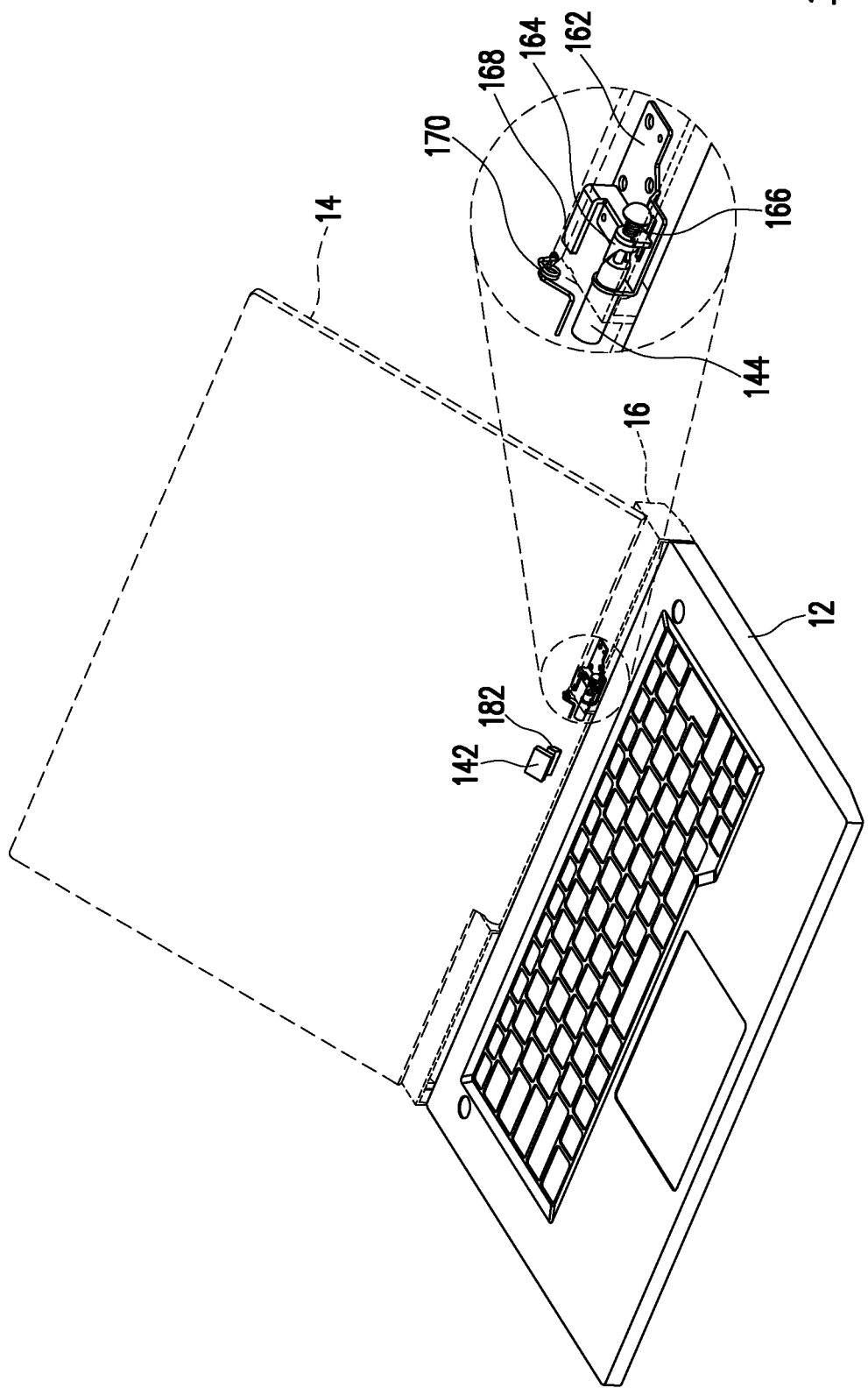
FIG. 2B is a schematic perspective diagram of the second machine body, the rotating member, and the pivot side in FIG. 1B.
Figure 3A:
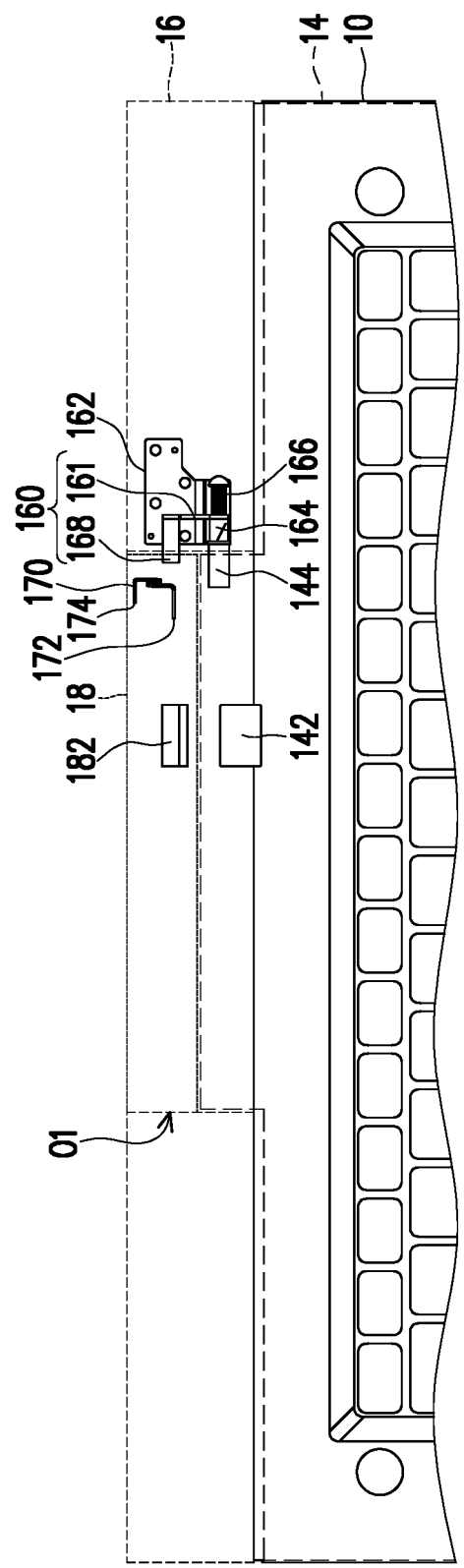
FIG. 3A is a schematic partial top view of FIG. 2A.
Figure 4A:
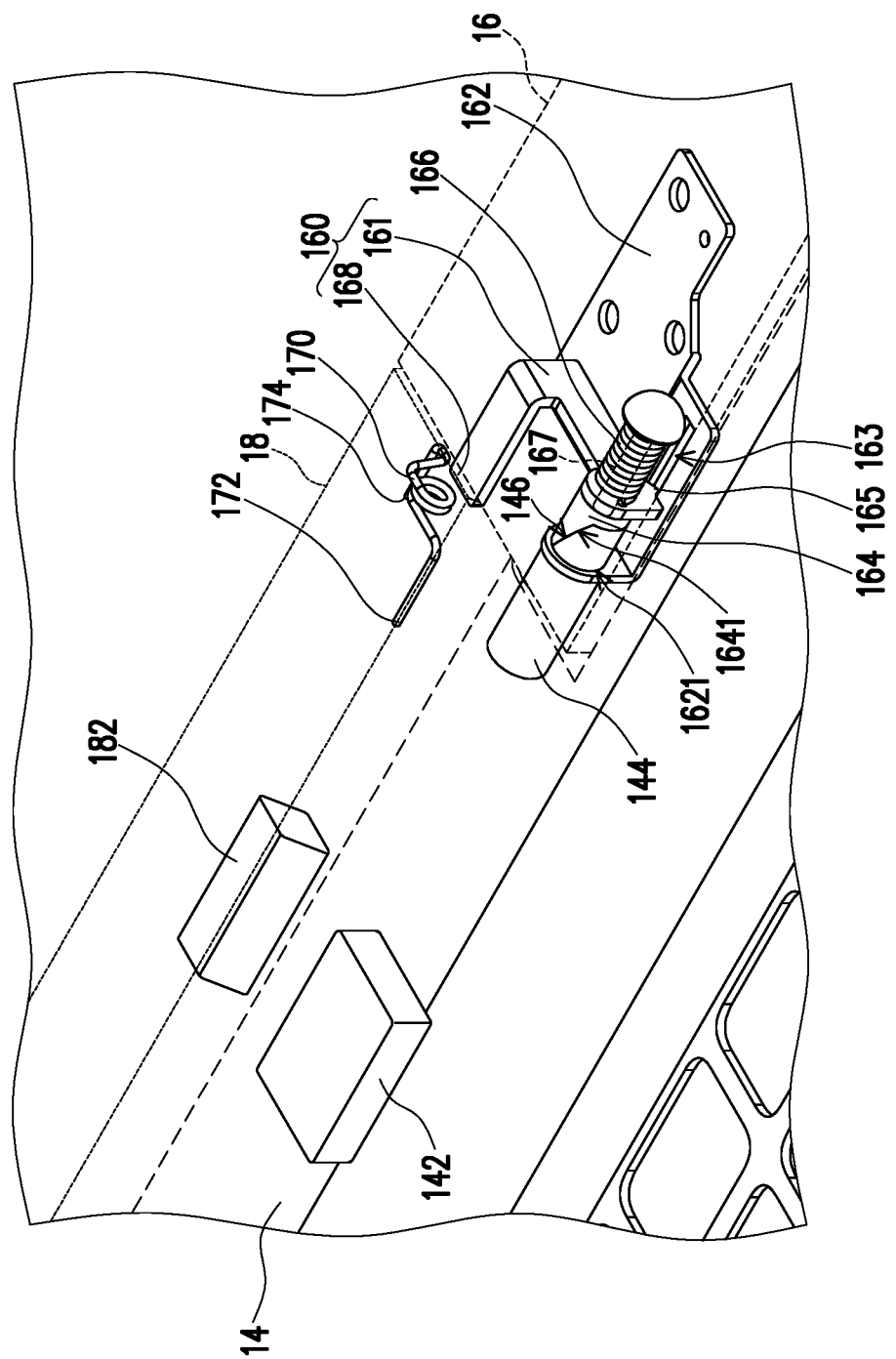
FIG. 4A is a schematic partially enlarged view of FIG. 2A.
Figure 4B:
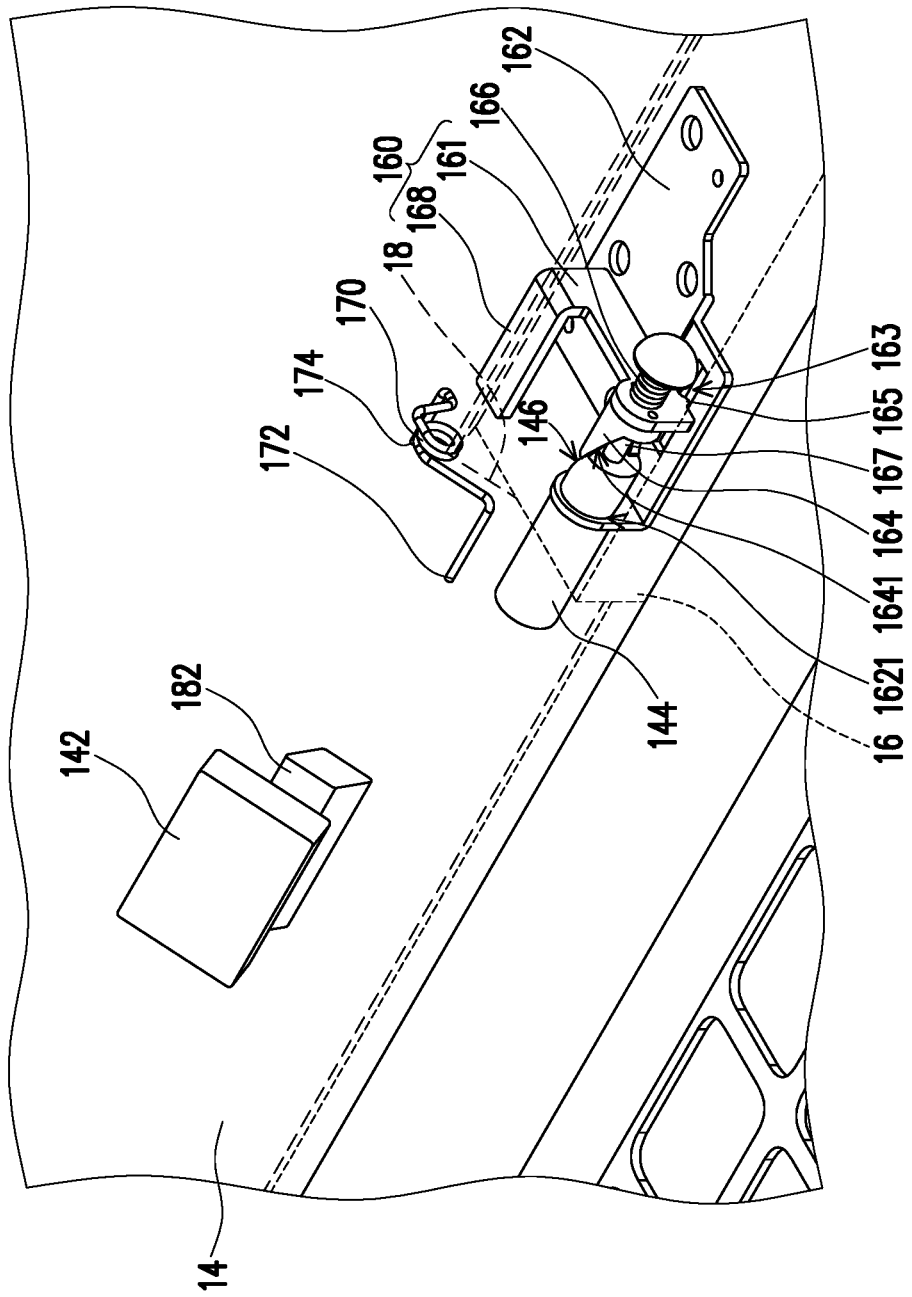
FIG. 4B is a schematic partially enlarged view of FIG. 2B.
Figure 5A:
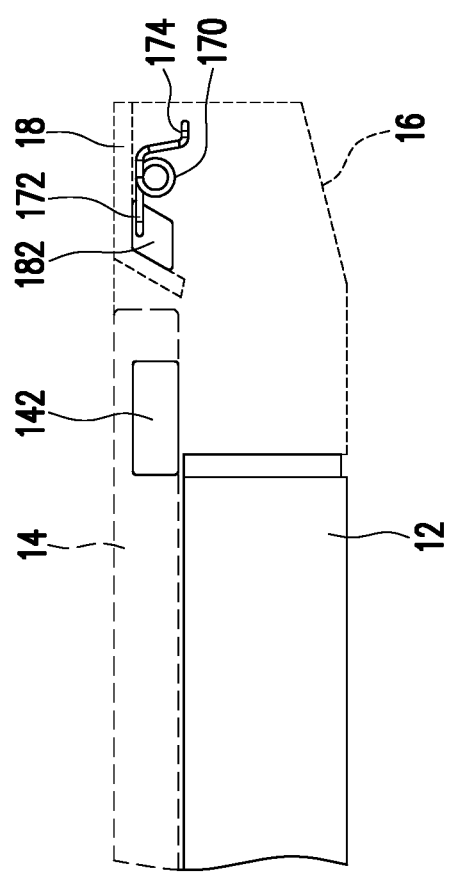
FIG. 5A is a schematic partial side schematic of FIG. 2A.
Figure 5B:
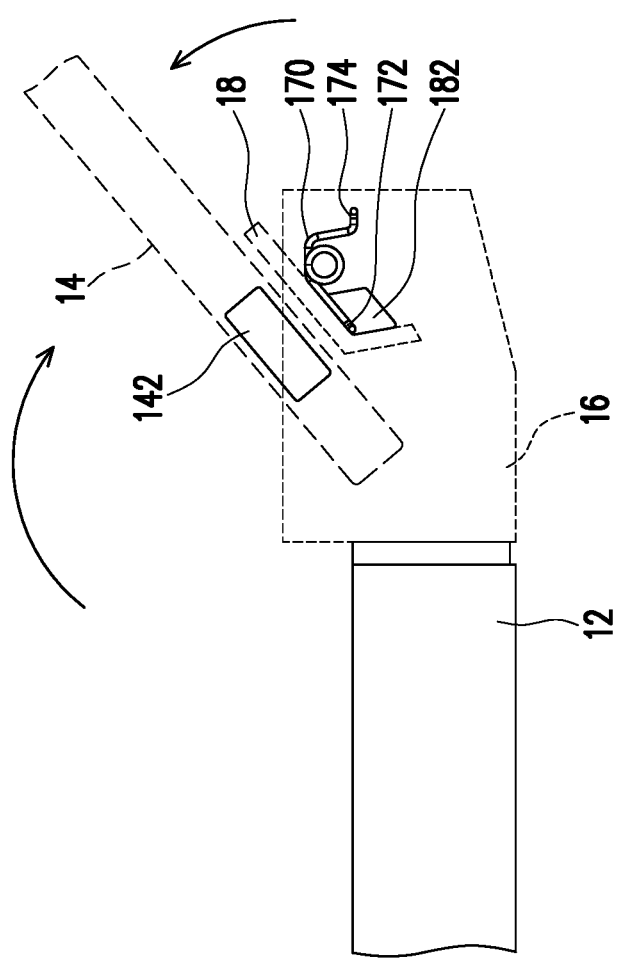
FIG. 5B is a schematic partial side schematic of FIG. 2B.

FIG. 2A is a schematic perspective diagram of the second machine body, the rotating member, and the pivot side in FIG. 1A. FIG. 2B is a schematic perspective diagram of the second machine body, the rotating member, and the pivot side in FIG. 1B. FIG. 3A is a schematic partial top view of FIG. 2A. FIG. 3B is a schematic partial top view of FIG. 2B. FIG. 4A is a schematic partially enlarged view of FIG. 2A. FIG. 4B is a schematic partially enlarged view of FIG. 2B. FIG. 5A is a schematic partial side schematic of FIG. 2A. FIG. 5B is a schematic partial side schematic of FIG. 2B.

Referring to FIG. 2A to FIG. 5B, in the present embodiment, the multi-body device 10 includes a rotating shaft 144, a first magnetic member 142, and a second magnetic member 182. In the present embodiment, the rotating shaft 144 is disposed at the second machine body 14. The second machine body 14 is pivoted to the first machine body 12 through the rotating shaft 144. The rotating shaft 144 has a first inclined surface 146.

In addition, in the present embodiment, the first magnetic member 142 is disposed at the second machine body 14. The second magnetic member 182 is disposed at a portion of the rotating member 18 corresponding to the first magnetic member 142. Two corresponding ends of the first magnetic member 142 and the second magnetic member 182 are magnetically repulsive to each other. In other words, a polarity of the first magnetic member 142 and the polarity of the second magnetic member 182 are opposite at the same poles. In other words, an N pole of the first magnetic member 142 may face an N pole of the second magnetic member 182, or an S pole of the first magnetic member 142 may face an S pole of the second magnetic member 182.

As shown in FIG. 5A, when the second machine body 14 is folded shut on the first machine body 12, a distance between the first magnetic member 142 and the second magnetic member 182 is still far, and the second magnetic member 182 is not affected by magnetic repulsion force of the first magnetic member 142. In this case, the rotating member 18 does not rotate but may well cover the air hole O2 (FIG. 1B), and fills the gap O1 of the first machine body 12 together with a part of the second machine body 14, so that an appearance of the multi-body device 10 may remain intact.

As shown in FIG. 5B, when the second machine body 14 is opened up relative to the first machine body 12, as the first magnetic member 142 approaches the second magnetic member 182, the second magnetic member 182 moves away from the first magnetic member 142 due to the magnetic repulsion force and drives the rotating member 18 to rotate, thereby making room for the second machine body 14 to rotate and avoiding interference. In the present embodiment, a rotation direction of the second machine body 14 and a rotation direction of the rotating member 18 are opposite. Definitely, in other embodiments, the rotation direction of the second machine body 14 may be the same as the rotation direction of the rotating member 18.

It is worth mentioning that, in order to prevent the rotating member 18 from rotation downwards due to accidental touch by a user when the second machine body 14 and the first machine body 12 are folded shut, in the present embodiment, the multi-body device 10 further includes a fixing member 162, a shaft 167, a moving member 164, and a stopper 160.

The fixing member 162 is fixed to the first machine body 12. For example, the fixing member 162 is fixed to the first machine body 12 by locking. However, the fixing member 162 may be fixed to the first machine body 12 by welding or in other methods. As shown in FIG. 4A, the fixing member 162 includes a pivot hole 1621 and a groove 163. The rotating shaft 144 of the second machine body 14 passes through the pivot hole 1621. In addition, in the present embodiment, the shaft 167 (FIG. 4B) fixes the first machine body 12.

In the present embodiment, the moving member 164 is movably disposed on the first machine body 12. More specifically, the moving member 164 is movably sleeved on the shaft 167. The moving member 164 has a second inclined surface 1641 abutting the first inclined surface 146.

In addition, the stopper 160 is sleeved on the shaft 167 and is driven by the moving member 164. More specifically, the stopper 160 includes a first segment 161 and a second segment 168 connected in a bending manner. The first segment 161 is sleeved on the shaft 167 and abuts the moving member 164. The second segment 168 of the stopper 160 is telescopically disposed on the pivot side 16 of the first machine body 12 to protrude out of the first machine body 12, or retract into the first machine body 12 and leave the rotation path of the rotating member 18.

In the present embodiment, the stopper 160 further includes a protrusion 165 stretching into the groove 163. Because the protrusion 165 stretches into the groove 163, a wall of the groove 163 of the fixing member 162 may serve as a limiting surface for restricting rotation of the protrusion 165. In other words, a combination of the protrusion 165 of the stopper 160 and the groove 163 of the fixing member 162 may ensure that the stopper 160 moves along with an extending direction of the groove 163 instead of rotating with the rotating shaft 144. Therefore, the second segment 168 of the stopper 160 moves along with the direction parallel to the groove 163 to protrude out of or retract into the first machine body 12.

Based on the foregoing design, as shown in FIG. 4A, when the second machine body 14 and the first machine body 12 are folded shut, the second inclined surface 1641 of the moving member 164 completely abuts the first inclined surface 146 of the rotating shaft 144. In this case, the second segment 168 of the stopper 160 protrudes from the first machine body 12 and stretches into (a rotation path) below the rotating member 18, thereby preventing the rotating member 18 from rotation due to a press down.

While the second machine body 14 is opened up, as shown in FIG. 4B, the rotating shaft 144 rotates, and the first inclined surface 146 of the rotating shaft 144 pushes the second inclined surface 1641 of the moving member 164. Because the moving member 164 is driven by the stopper 160, the protrusion 165 of the stopper 160 may only move along with the groove 163.

Therefore, the rotating shaft 144 rotates to allow the moving member 164 and the stopper 160 to move along with the groove 163, whereby the second segment 168 of the stopper 160 is adapted for retracting into the first machine body 12 and retreating from the rotation path (below the rotating member 18). In this case, the second magnetic member 182 of the rotating member 18 rotates due to a magnetic repulsive force of the first magnetic member 142 of the second machine body 14 to make room.

It is worth mentioning that in the present embodiment, the multi-body device 10 further includes a torsion spring 170 and an elastic member 166. One end 174 of the torsion spring 170 is fixed to the pivot side of the first machine body 12, and the other end 172 of the torsion spring 170 is fixed to the rotating member 18. When the second machine body 14 is opened up, the torsion spring 170 accumulates elastic potential energy. As the second machine body 14 approaches the first machine body 12 (for example, approaching until an included angle is about 70 degrees), a distance between the first magnetic member 142 and the second magnetic member 182 becomes longer, and the second magnetic member 182 is not affected by the magnetic repulsive force of the first magnetic member 142, and the torsion spring 170 releases the elastic potential energy to drive the rotating member 18 to return.

In addition, the elastic member 166 is sleeved on the shaft 167 and abuts the moving member 164 or the stopper 160. The elastic member 166 is, for example, a compression spring, but the type of the elastic member 166 is not limited thereto. When the second machine body 14 is opened up, the elastic member 166 is compressed to accumulate the elastic potential energy. When the second machine body 14 is approaching the first machine body 12, the elastic member 166 releases the accumulated elastic potential energy, to cause the moving member 164 and the stopper 160 to return. In this way, the second segment 168 of the stopper 160 protrudes out of the pivot side of the first machine body 12 and stretches into (a rotation path) below the rotating member 18 to prevent the rotating member 18 from being accidentally pressed.

In the multi-body device 10 of the present embodiment, when the second machine body 14 is opened up to 90 degrees (but not limited thereto) relative to the first machine body 12, it is provided that a structure (the rotating member 18) behind the second machine body 14 may automatically retreat, to make room for the second machine body 14 to rotate. In addition, the multi-body device 10 of the present embodiment further provides a design for the rotating member 18 to automatically return, so that an overall appearance of the multi-body device 10 may remain intact when the second machine body 14 is folded shut. In addition, when the second machine body 14 is still folded shut a retractable stopper 160 is further disposed below the rotating member 18 to avoid that a user accidentally presses the rotating member 18, which causes the rotating member 18 to rotate downward unexpectedly, and thereby damages an internal component.

To sum up, the rotating member of the multi-body device provided in one or more embodiment of the disclosure is disposed on the pivot side of the first machine body and is located beside the second machine body, so that the appearance of the multi-body device remains intact when the second machine body and the first machine body are folded shut. In addition, the first magnetic member is disposed at the second machine body. The second magnetic member is disposed at the rotating member, and the first magnetic member and the second magnetic member are mutually repulsive to each other. As the second machine body is opened up relative to the first machine body, the first magnetic member approaches the second magnetic member, so the second magnetic member moves away from the first magnetic member due to the magnetic repulsion force and drives the rotating member to rotate, thus making room for preventing interference with the second machine body. Moreover, the stopper is driven by the second machine body and is retractably disposed at the pivot side of the first machine body, so as to be adapted to stretch into or leave the rotation path of the rotating member. When the second machine body and the first machine body are folded shut, the stopper stretches into the rotation path of the rotating member to prevent the rotating member from rotating due to accidental touch.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure cover modifications and variations provided that they fall within the scope of the following claims and their equivalents.

What is claimed is:

1. A multi-body device, comprising:
   a first machine body;
   a second machine body, pivoted to a pivot side of the first machine body;
   a rotating member, pivoted to the pivot side of the first machine body and located beside the second machine body;
   a first magnetic member, disposed at the second machine body;
   a second magnetic member, disposed at a portion of the rotating member corresponding to the first magnetic member, two corresponding ends of the first magnetic member and the second magnetic member being magnetically repulsive to each other; and
   a stopper, driven by the second machine body and disposed at the pivot side of the first machine body, so as to be adapted to stretch into or retreat from a rotation path of the rotating member, wherein when the second machine body and the first machine body are folded shut, the second machine body drives the stopper to stretch into the rotation path of the rotating member to prevent the rotating member from rotating, and
   when the second machine body is opened up relative to the first machine body, the second machine body drives the stopper to retreat from the rotation path of the rotating member, and drives the first magnetic member to approach the second magnetic member, so the second magnetic member moves away from the first magnetic member due to a magnetic repulsive force and drives the rotating member to rotate to prevent the rotating member from interfering with the second machine body during rotation of the second machine body.

2. The multi-body device according to claim 1, further comprising:
   a torsion spring, one end of the torsion spring being fixed to the first machine body, the other end of the torsion spring being fixed to the rotating member, wherein when the second machine body approaches the first machine body, the torsion spring drives the rotating member to return, and the stopper stretches into the rotation path of the rotating member.

3. The multi-body device according to claim 1, further comprising:
   a rotating shaft, disposed at the second machine body, pivoted to the first machine body, and comprising a first inclined surface.

4. The multi-body device according to claim 3, further comprising:
   a shaft, disposed at the first machine body, the rotating shaft being sleeved on the shaft; and
   a moving member, movably disposed at the first machine body and comprising a second inclined surface abutting the first inclined surface, the stopper being driven by the moving member, wherein while second machine body is being opened up, the rotating shaft rotates, and the first inclined surface drives the second inclined surface to move the moving member, whereby the stopper retreats from the rotation path of the rotating member.

5. The multi-body device according to claim 4, further comprising:
   an elastic member, sleeved on the shaft and abutting the moving member or the stopper, so that the moving member returns while the second machine body is approaching the first machine body.

6. The multi-body device according to claim 4, further comprising:
   a fixing member, fixed to the first machine body and comprising a pivot hole and a groove, the rotating shaft passing through the pivot hole, the stopper being sleeved on the shaft and comprising a protrusion stretching into the groove.

7. The multi-body device according to claim 4, wherein the stopper comprises a first segment and a second segment connected in a bending manner, the first segment is sleeved on the shaft, and the second segment is adapted for stretching into the rotation path of the rotating element or retracting into the first machine body to leave the rotation path of the rotating member.

8. The multi-body device according to claim 1, wherein the pivot side of the first machine body comprises a gap, and when the second machine body and the first machine body are folded shut, the gap is filled with the rotating member and a part of the second machine body.

9. The multi-body device according to claim 1, wherein the pivot side of the first machine body comprises an air outlet, when the second machine body and the first machine body are folded shut, the rotating member covers the air outlet, and when the second machine body is opened up relative to the first machine body, the rotating member is lifted to expose the air outlet.

10. The multi-body device according to claim 1, wherein a rotation direction of the second machine body is opposite to a rotation direction of the rotating member.

\* \* \* \* \*